United States Patent [19]
Arai

[11] Patent Number: 4,742,560
[45] Date of Patent: May 3, 1988

[54] MOBILE RADIO UNIT IN CELLULAR WIDE RANGE MOBILE COMMUNICATION SYSTEM

[75] Inventor: Kanji Arai, Tokyo, Japan

[73] Assignee: Oki Electric Industry Co., Ltd., Tokyo, Japan

[21] Appl. No.: 839,867

[22] Filed: Mar. 14, 1986

[30] Foreign Application Priority Data

Mar. 19, 1985 [JP] Japan ................................. 60-53222

[51] Int. Cl.⁴ .......................... H04Q 7/00; H04B 1/00
[52] U.S. Cl. ....................................... 455/33; 455/38; 455/56; 379/62
[58] Field of Search ....................... 455/33, 38, 53, 54, 455/56, 58; 379/59, 62, 63

[56]          References Cited
U.S. PATENT DOCUMENTS 4,545,071 10/1985 Freeburg ................................. 455/33

4,573,206 2/1986 Gravel et al. .......................... 455/33
4,639,550 1/1987 Yamagawa et al. ................... 379/62

OTHER PUBLICATIONS

"Mobile Phone Starts to Run to a Commercial Base", Iizuka et al., Nikkei Electronics, pp. 58–84, Jun. 26, 1978.
"Advanced Mobile Phone Service: Control Architecture", Z. C. Fluhr et al., The Bell System Technical Journal, Jan. 1979.

Primary Examiner—Robert L. Griffin
Assistant Examiner—Curtis Kuntz
Attorney, Agent, or Firm—Wenderoth, Lind & Ponack

[57]              ABSTRACT

A mobile radio unit assures a wide area communication system having a function equal to a tracking exchange function and profitably employing an equipment of the existing exchange as it is. The mobile radio unit stores a secret number to assure a terminating limit service.

1 Claim, 9 Drawing Sheets

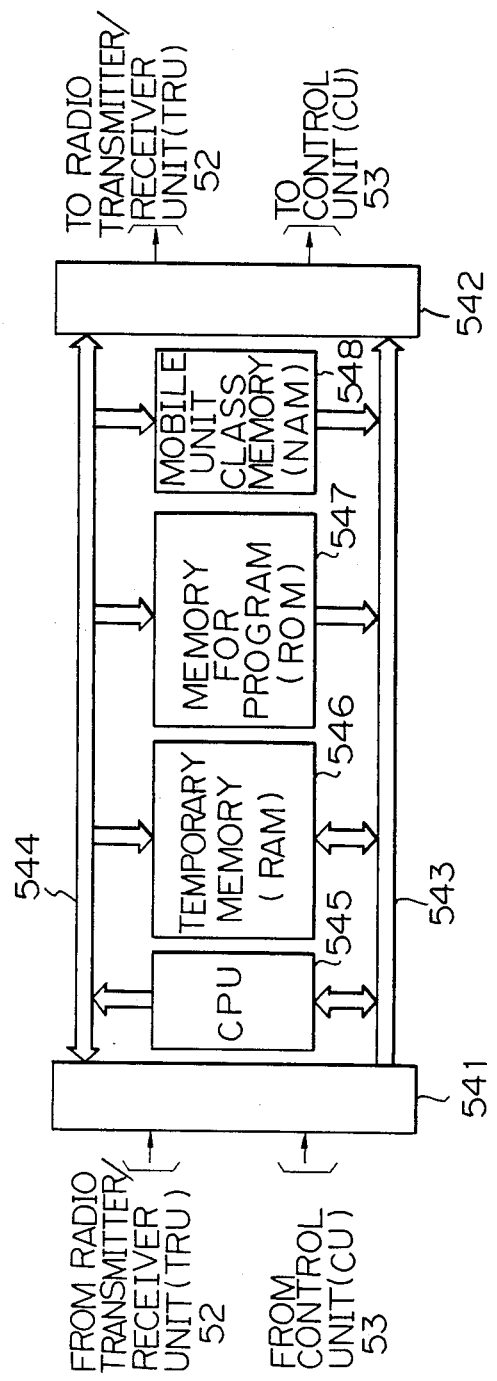

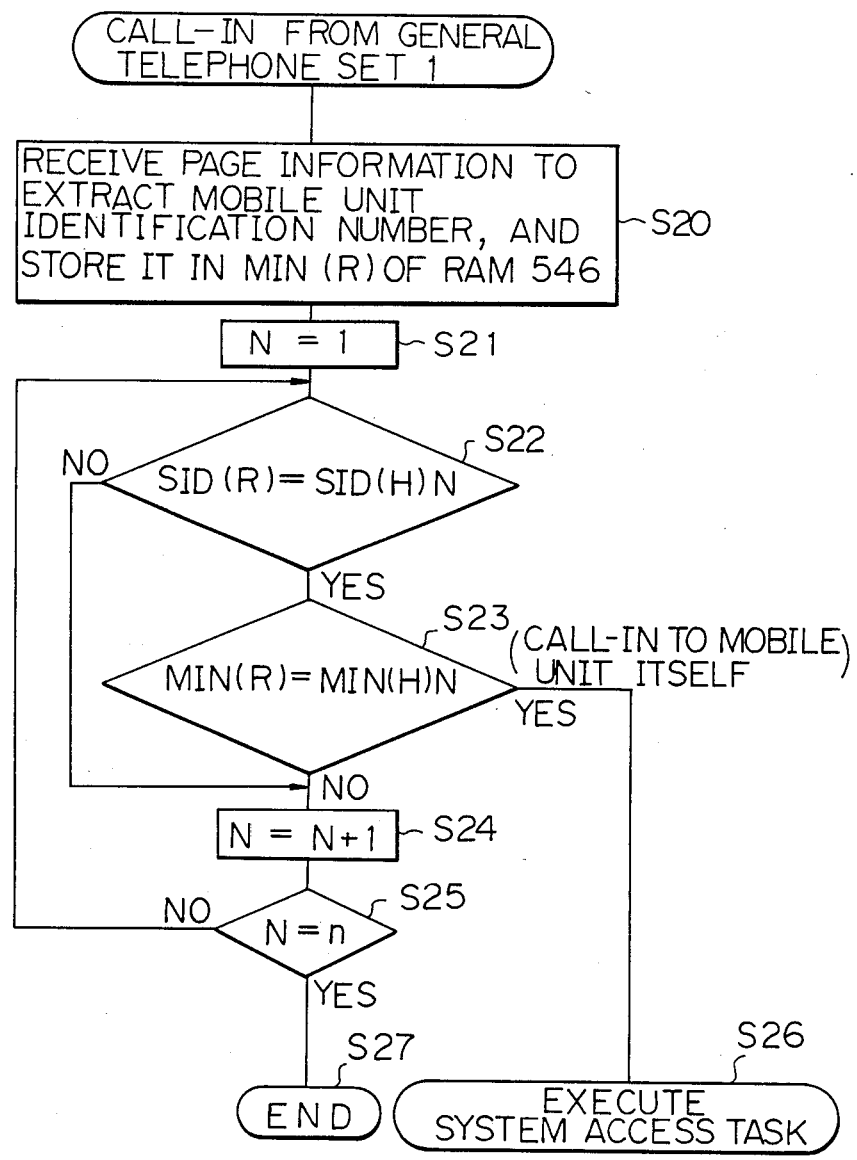

Fig. 8(a)    Fig. 8(b)    Fig. 8(c)

RAM 546

| SID (S) |
| SID (R) |
| MIN (R) |
| |
| PR |

NAM 548

| SID(H)1 |
| MIN(H)11 |
| MIN(H)12 |

NAM 548

| SID(H)1 |
| MIN(H)11 |
| MIN(H)12 |
| SID(H)2 |
| MIN(H)21 |
| MIN(H)22 |
| ⋮ |
| SID(H)n |
| MIN(H)n1 |
| MIN(H)n2 |

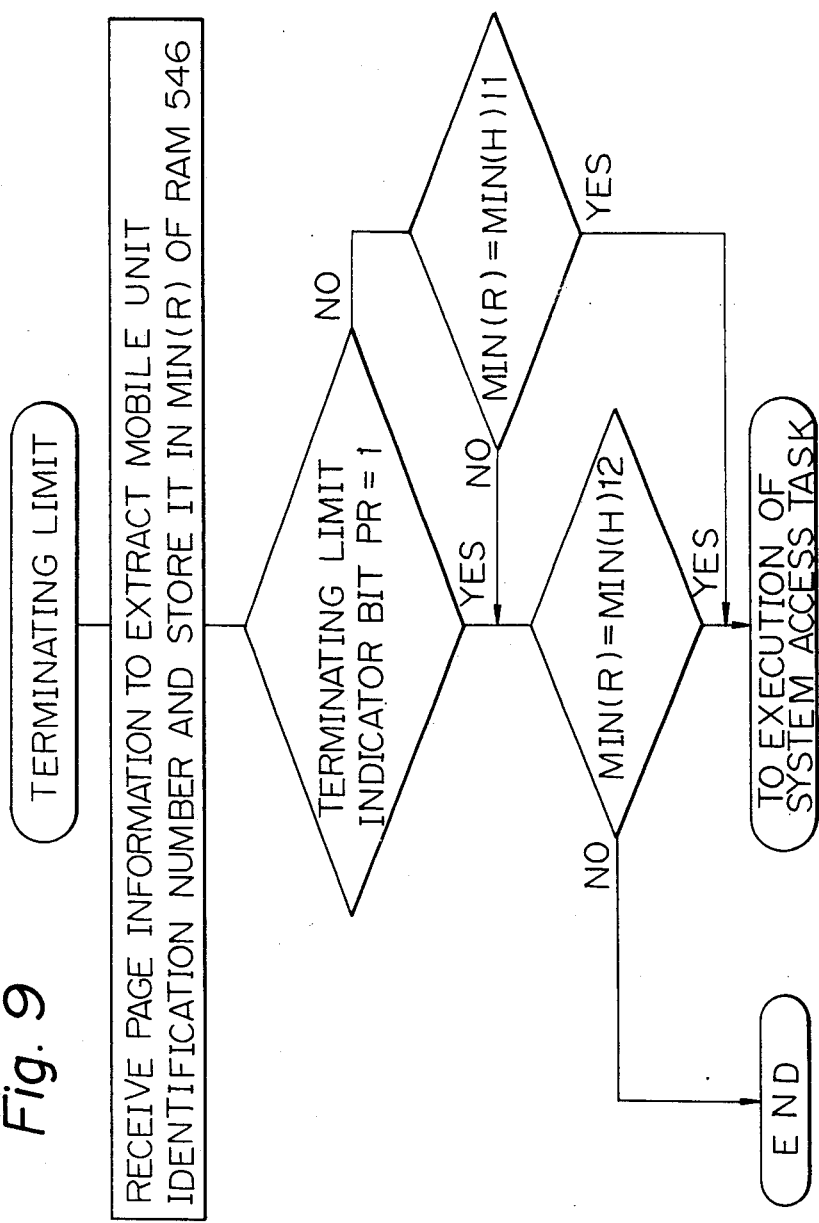

MOBILE RADIO UNIT IN CELLULAR WIDE RANGE MOBILE COMMUNICATION SYSTEM

BACKGROUND OF THE INVENTION

1. Field of the Invention

The present invention relates to a mobile radio in a cellular wide range mobile communication system.

2. Description of the Prior Art

A mobile phone system comprises a mobile unit, a cell site, and a mobile telecommunication switching office (MTSO), and effects connections among different MTSOs and a connection with a general telephone set via general telephone line. In the mobile phone system, an automatic telephone exchange office is required to store the position of a mobile since it moves at all times. Therefore, when the mobile runs over a very wide area, the position is automatically registered from the mobile unit into the automatic telephone exchange office.

Thus, a tracking exchange function is necessary to track a position of the mobile unit. Such a tracking exchange function is disclosed, for example, in Z. C. Fluhr and P. T. Porter "Advanced Mobile Phone Service: Control Architecture" THE BELL SYSTEM TECHNICAL JOURNAL, Vol. 58, No. 1, January 1979, pp 43 to 69, and Iizuka et al "Mobile Phone starts to Run to a Commercial Base" Nikkei Electronics, June 26, 1978, pp 58 to 78 (in Japanese). Namely, the wide area mobile communication system includes in general many service areas, each of which usually has a mobile communication switching office. The present position of the mobile unit is stored in a home memory office (effected by MTSO) as a part of subscriber's information. With any call in to the mobile unit, a corresponding mobile communication switching office accesses to the home memory office and investigates the present position of the call-in mobile unit to control terminating connection to the corresponding area.

However, the wide area mobile communication system described above requires of the existing telephone exchange network to be modified for obtaining a tracking exchange function, and further it needs to provide position detection and position registration functions to itself. Thus, the prior wide area mobile communication system suffers from a problem of an increase in cost required for the system itself including the mobile unit.

SUMMARY OF THE INVENTION

It is an object of the present invention to provide a mobile radio unit capable of assuring a wide area communication system having a function equal to a tracking exchange function and profitably employing an equipment of the existing exchange as it is.

Another object of the present invention is to enable the mobile radio unit to store a secret number to assure a terminating limit service.

To achieve the above object, a mobile radio unit according to the first invention comprises a radio transmitter/receiver unit (TRU), a handset composed of a dial and a telephone transmitter/receiver, a control unit (CU) for controlling a speech path and the handset, an input circuit with a data receiver for entering signals from the radio transmitter/receiver unit (TRU) and the control unit (CU) to a CPU; an output circuit with a data transmitter for delivering signals from the CPU to the radio transmitter/receiver unit (TRU) and the control unit (CU), a memory part (RAM) for temporarily storing a service area identification code and a mobile unit identification number received by the radio transmitter/receiver unit and entered via the input circuit, a memory part (NAM) for registering a plurality of the coupled service area identification codes and mobile unit identification numbers corresponding to service areas, a decision means for deciding whether the service area identification code stored in the RAM and that registered in the NAM are coincident with each other, a terminating connection means, and other known necessary means. With the arrangement described above, the mobile radio unit according to the present invention effects a call-in response when the service area identification code registered in the NAM and the mobile unit identification number coupled with this service area identification code registered in the NAM, and the service area identification code stored in the RAM and the mobile unit identification number are stored in the RAM coincident with each other.

In addition, a mobile radio unit according to the second invention comprises a radio transmitter/receiver unit (TRU) for transmitting/receiving a signal, a handset composed of a dial and a telephone transmitter/receiver, a control unit (CU) for controlling a speech path and the handset, an input circuit with a data receiver for entering signals from the radio transmitter/receiver unit (TRU) and the control unit (CU) to a CPU, an output circuit with a data transmitter for delivering signals from the CPU to the radio transmitter/receiver unit (TRU) and the control unit (CU), a memory part (RAM) for temporarily storing a service area identification code and a mobile unit identification number received by the radio transmitter/receiver unit and entered via the input circuit while including call-in controlled indicator information set/reset by operation of the handset, a memory part (NAM) for setting the service area identification code and a plurality of classes of mobile unit identification numbers corresponding to the service area identification code for registering them, a decision means for deciding whether the service area identification code stored in the RAM is coincident with the service area identification code registered in the NAM or not, a decision means for comparing the mobile unit identification number stored in the RAM with all of or only a part (opened mobile unit identification number) of the plurality of kinds of the mobile unit identification numbers registered in the NAM depending on a state (set or reset) of call-in control indicator information and thereby deciding whether the call-in is for itself or not, and a terminating connection means. The mobile radio unit effects a call-in response when the service area identification code stored in the RAM and that registered in the NAM are coincident with each other, and when the mobile unit identification number stored in the RAM and the plurality of the mobile unit identification numbers registered in the NAM are coincident with each other in response to a state of call-in control indicator bit.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a block diagram illustrating a logical unit 54, FIG. 7 is a flowchart illustrating operation of a program for deciding call-in from a general telephone set 1, FIG. 8a is a view illustrating the contents of the RAM 546 in a second embodiment of the present invention, FIGS. 8b and 8c are views illustrating the contents of the NAM 548 in the second embodiment of the present invention, and FIG. 9 is a flowchart illustrating operation of terminating limit in the second embodiment.

DESCRIPTION OF THE PREFERRED EMBODIMENT

Figure 1:
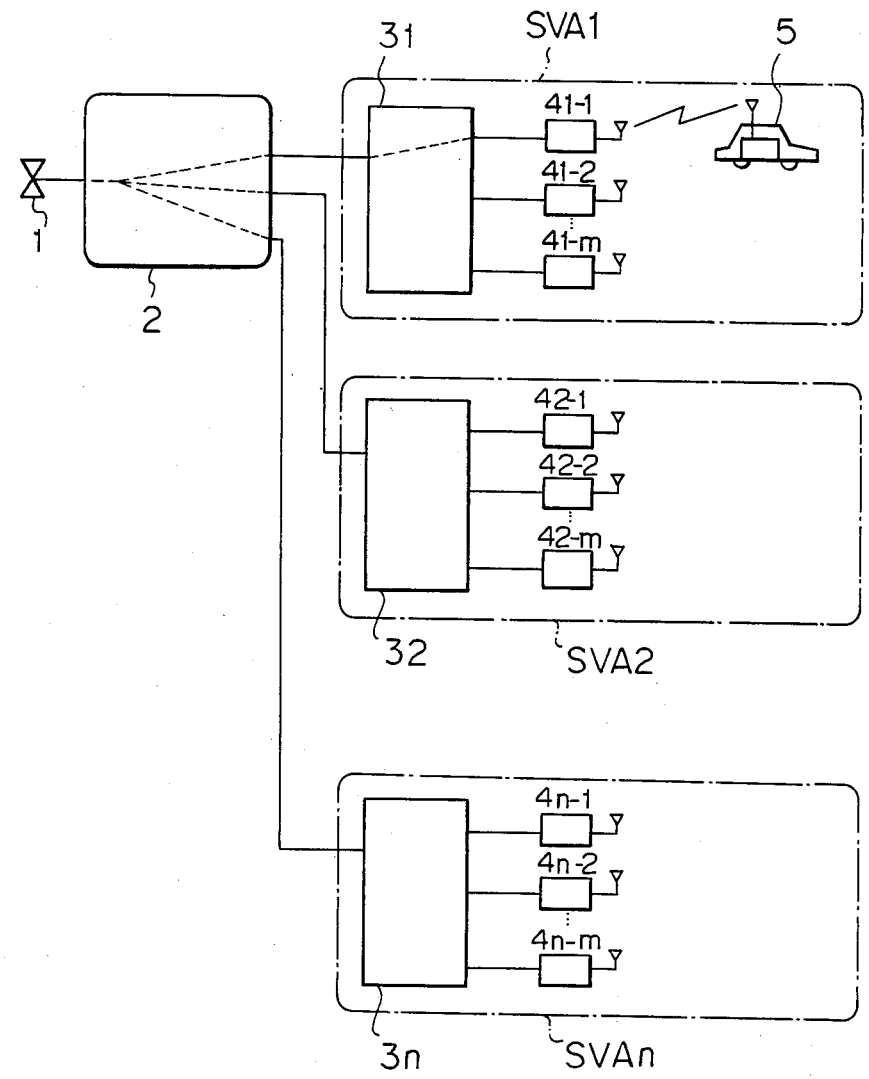
FIG. 1 is a schematic general view illustrating a prior phone system.

As shown in FIG. 1 illustrating the whole of a mobile phone system, designated at 1 is a general telephone set, 2 is a general telephone network, 31 to 3n are respectively mobile telecommunication switching offices (MTSO), 41-1 to 4n-m are respectively cell sites, 5 is a mobile unit, and SVA1 to SVAn are respectively service areas. The wide area communication system is applied to a plurality of service areas from the SVA1 to SVAn, each service area being composed of a group of sub-areas, each sub-area being called cells. The cell site is installed at the center of each cell to cover whole communication within the cell. Each service area has one of the mobile telecommunication switching offices (MTSOs) 31 to 3n, which takes a leading roll in the mobile phone system and interfaces the mobile unit 5 with the telephone network 2. The mobile unit 5 communicates with a neighbouring cell site via a radio channel assigned to the cell site. Each cell site is connected with the general telephone network 2 via the MTSO.

Figure 2:
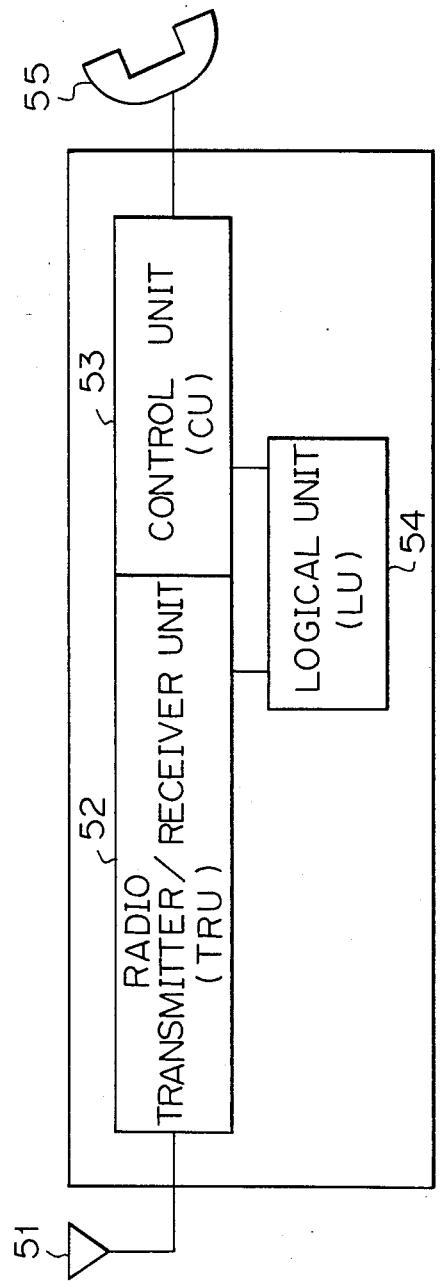
FIG. 2 is a block diagram illustrating a main functional part of a mobile unit 5 according to the present invention.
Figure 4A:
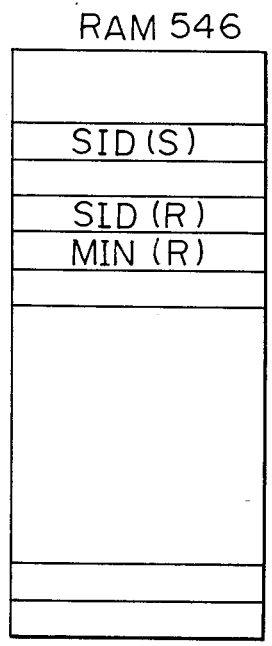
FIG. 4 is a view illustrating the contents of a RAM 546 in a first embodiment according to the present invention.
FIG. 4b is a view illustrating the contents of a mobile unit class memory (NAM) 548 in the first embodiment.
Figure 4B:
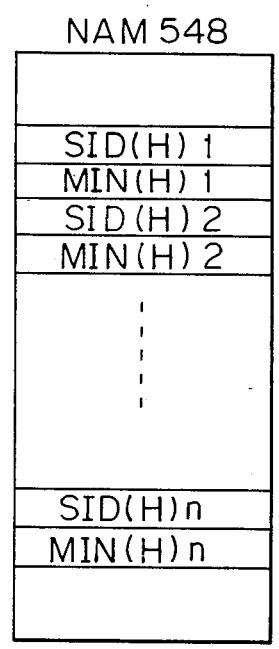

In FIG. 2 illustrating a main function part of the mobile unit 5 according to the present invention, designated at 51 is an antenna, 52 is a radio transmitter/receiver unit (TRU) 52, 55 is a handset integrally constructed with a push button dial and a telephone transmitter/receiver, 53 is a control unit (CU) for controlling associated channels and the handset 55, and 54 is a logical unit (LU). The logical unit 54 is arranged as shown in FIG. 3. In the same figure, designated 541 is an input circuit for entering signals from the control unit 53 and the radio transmitter/receiver unit 52 to a CPU and which includes a data receiver for demodulating data control signals, 542 is an output circuit for delivering a signal to the radio transmitter/receiver unit 52 and the control unit 53 and which includes a data transmiter for modulating data control signals, 543 is a data bus, 544 is an address bus, 545 is the CPU, 546 is a temporary memory (RAM) for temporarily storing various data, 547 is a read only memory (ROM) for storing a control program, and 548 is a mobile unit class memory (NAM) for storing peculiar to individual mobile units. FIG. 4a shows only a portion associated with the present invention of data stored in the RAM 546, while FIG. 4b shows the same stored in the NAM 548.

Each of the service areas SVA1 to SVAn designates a wide are extending over the whole district of a large city. The mobile unit 5 stores different telephone numbers corresponding to the service areas SVA1 to SVAn. The NAM 548 of FIG. 4b serving to store these data stores service area identification codes SID(H)1 to SID(H)n corresponding to the respective mobile telecommunication switching offices (service areas) and telephone numbers MI(H)1 to MI(H)n of the mobile unit 5 provided corresponding to the respective mobile telecommunication switching offices.

Figure 5:
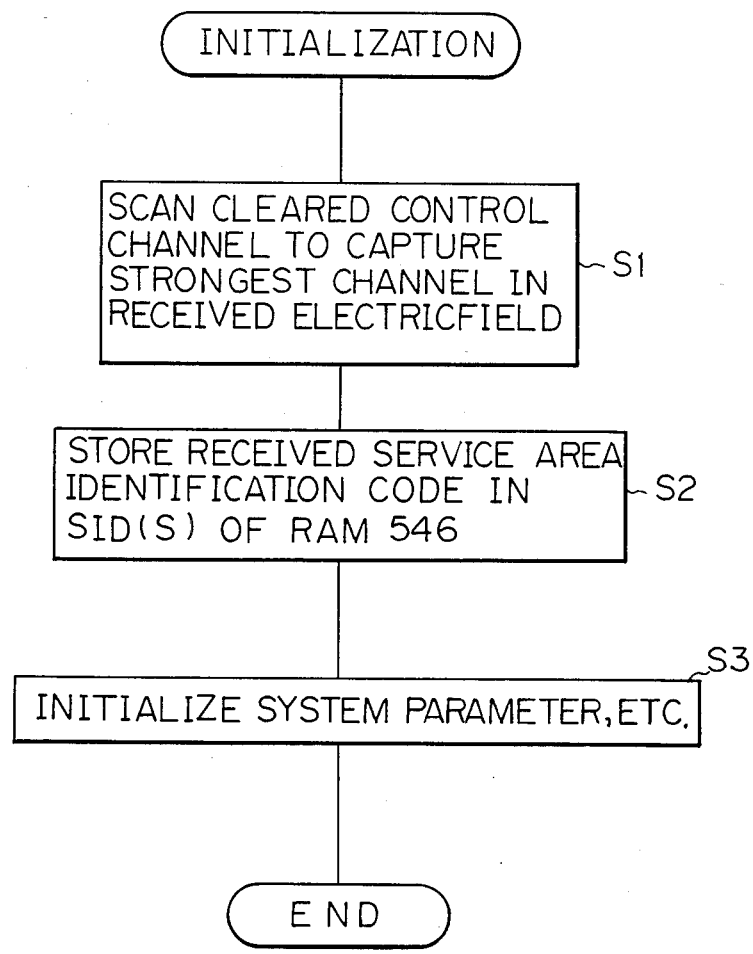
FIG. 5 is a flowchart showing operation of an initialization program.

The mobile unit 5 must be ready to receive any signal with a power source switched on before receiving a call. So, assuming first the mobile unit 5 is present in the service area SVA1 of FIG. 1, operation of the mobile unit 5 upon powering it will be described. In FIG. 5 illustrating operation of an initialization program stored in the ROM 547 to be executed upon powering the mobile unit 5, first with a cleared control channel scanned, a channel strongest in a received electric field is captured (FIG. 5 S1), and a service area identification code is stored in SID(S) of the RAM 546 of FIG. 4a (FIG. 5 S2). Successively, system parameters, etc., needed to process subsequent calling are initialized (FIG. 5 S3) but the description thereof will be omitted since it is not related to that of the present invention.

Figure 6:
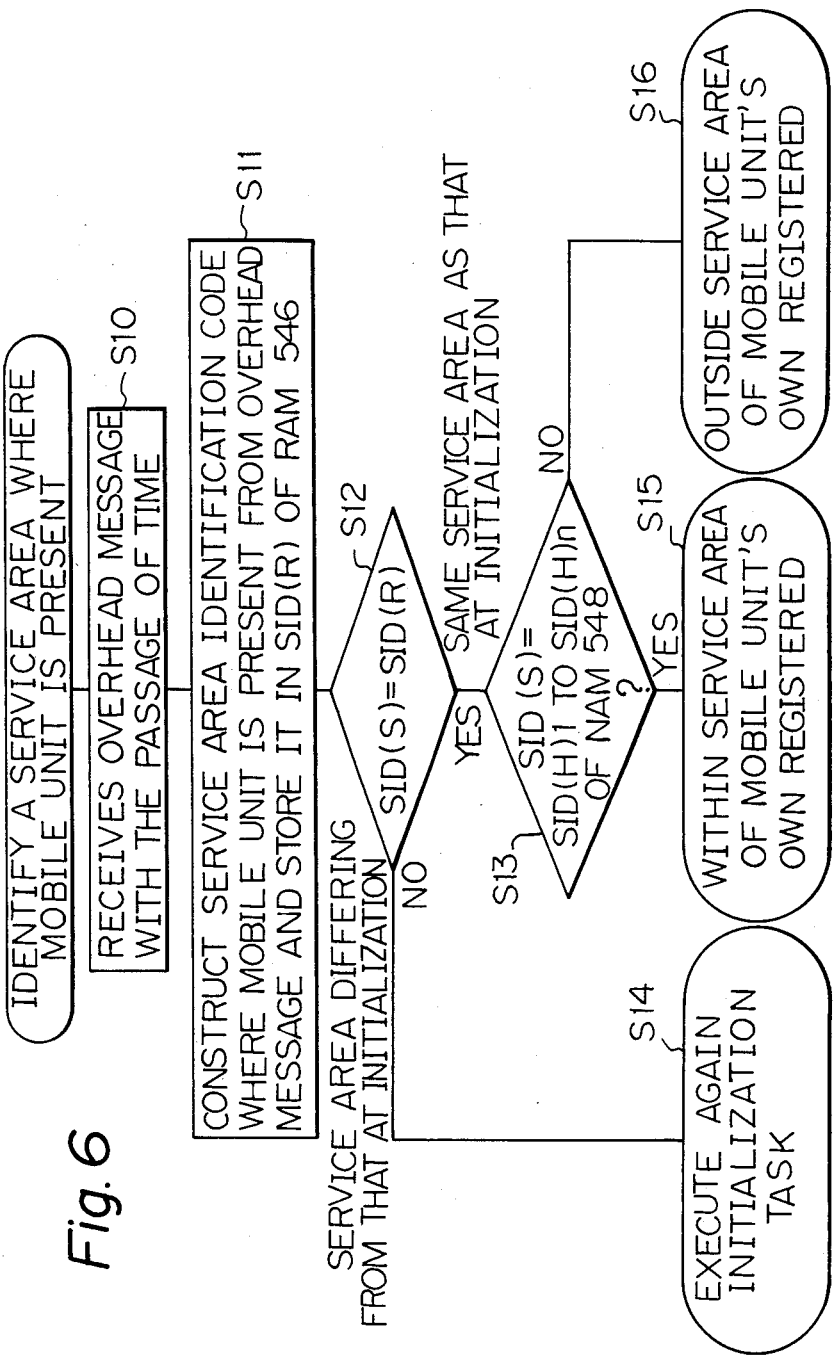
FIG. 6 is a flowchart illustrating operation of a program for identifying a service area where the mobile unit 5 is present.

Then, the operation starts to select a page channel (receiving channel), and captures the strongest channel to again receive an overhead message to thereby identify a service area in which the mobile unit itself is present, as shown in FIG. 6. The overhead message is received with the passage of time, from which a code to identify a service area in which the mobile unit 5 itself is present is constructed and stored in SID(R) of the RAM 546 (FIG. 6 S11). Successively, the service area identification code SID(R) is compared with a service area identification code SID(S) which is received and stored ahead of the former code (FIG. 6 S12). SID(S)=SID(R) shows that the mobile unit 5 is found in the same service area at the present time and at the time when the mobile unit 5 executes an initialization task. In this case, it is decided whether the mobile unit 5 is present in a service area where the mobile unit 5 itself registered to be present (homer state) or not (romer state). The decision is assured by deciding whether the service area identification code stored in SID(S) is the same as one of the service are identification codes stored in SID(H)1 to SID(H)n or not (FIG. 6 S13). Accordingly, the homer state is decided if the service area in question is the same as one of a plurality of the service area identification codes registered (FIG. 6 S15), otherwise it is decided the mobile unit 5 is present in a service area outside (romer state) its own service area registered (FIG. 6 S16). In addition, provided that the mobile unit 5 runs from the service area where it stayed upon the execution of the initialization task to another service area, the operation again executes the initialization task since SID(S)=SID(R) (FIG. 6 S14). And, as described before, the service area identification code corresponding to the present position of the mobile unit 5 is stored in SID(S) of the RAM 546 of FIG. 4a and thereafter the operation repeats according to the flow shown in FIG. 6.

Next, operation of the present system when the general telephone set 1 makes a call to the mobile unit 5 present in the service area SVA 1 will be described.

Since in the present invention a mobile unit has a different telephone number for each service area, a caller must call after finding where the mobile unit 5 stays at that time among the many service areas, with use of a telephone number corresponding to its service area. Let us now consider a case the number of the mobile unit 5 corresponding to the service area SVA 1 is sent from the general telephone set 1. A general telephone set 2 receives it for its analysis, and identifies it as a call to the service area SVA 1 to set a route A to the telecommunication switching office 31. The mobile telecommunication switching office 31 controls calling to the mobile unit 5 via a part or the whole of the cell sites 41-1 to 41-n which are under the command of the switching office 31. Thereafter, the mobile unit 5 executes a program stored in the ROM 547 following the procedure shown in FIG. 7. The mobile unit 5 keeps on monitoring the page channel, and receives page information successively set out of the mobile telecommunication switching office 31 to extract a mobile unit identification number (telephone number) and store it in MIN(R) of the RAM 546 of FIG. 4a (FIG. 7 S20). Then, the mobile unit 5 effects collating operation of whether the mobile unit identification number is the number provided to itself. Namely, it is checked whether the mobile telephone numbers MIN(H)1 to MIN(H)n respectively coupled with the service area identification codes SID(H)1 to SID(H)n registered in the NAM 548 are equal to SID(R) and MI(R) or not (FIG. 7 S21 to S25). Provided that one of the service area identification codes and a mobile unit telephone number coupled thereto are respectively coincident with SID(R) and MI(R), it is decided to be that directed to the mobile unit itself, whereby the operation is advanced to execute a system access task stored in the ROM S47 to send back page response indication to the mobile telecommunication switching office 31 (FIG. 7 S26). Thereafter, terminating connection is effected from the general telephone sets to the mobile unit 5 with use of an ordinary method. Moreover, provided that no coincidence is found, it is decided that the mobile unit itself is not called. Also when the mobile unit 5 is found in another service area SUAn, terminating connection is likewise effected by dialing a telephone number (mobile unit identification number) corresponding to the service area. In addition, also when a call is made from a mobile unit present in a certain service area to one present in another service area, the same procedure is applied.

For any call made by the mobile unit 5, a conventional system is employed without any modification, so the description thereof is omitted here.

Then, another embodiment of a mobile unit according to the present invention further having a function of terminating limit will be described. The function is assured by specifying and a specific bit of the RAM 546 of FIG. 4a as a terminating limit indicator bit and registering two kinds of mobile unit identification numbers (telephone number) in the NAM 548 of FIG. 4b corresponding to the service area identification number. FIGS. 8a, 8b, and 8c show arrangements of the RAM 546 and the NAM 548 for realizing the function, and in particular FIG. 8a shows the contents of the RAM 546 wherein PR designates a terminating limit indicator bit and other portions has the same meaning as those of FIG. 4a, and FIG. 8b shows the NAM 548 of which two kinds of mobile unit identification numbers MIN(H)11 and MIN(H)12 are stored in the service area identification code SID(H)1. These two kinds of mobile unit identification numbers are specified to be an open number in one and a closed number in the other, and any one therebetween is limited in its termination. In the present embodiment, MIN(H)11 is assumed to be specified to be the closed number which is limited in its termination. A terminating limit indicator bit PR comprises one bit which can be freely set or reset by an operator of the mobile unit 5 with use of keys of and operating part provided in the handset 55 of FIG. 2. Operation of the terminating limit will be described with reference to a flow chart shown in FIG. 9. First, the mobile unit 5 receives page information to extract a mobile unit identification number therefrom and stores it in MIN(R). Then, the mobile unit 5 decides whether the terminating limit indicator bit PR (FIG. 9 S31) is set or not, and, if set, judges, while ignoring MIN(H)11 being a closed number, whether the received mobile identification number is equal to only MIN(H) of an open number or not (FIG. 9 S32). If the former number is equal to the latter one, the mobile unit 5 decides it for a call to itself and advances to execution of a system access task to effect terminating connection operation (FIG. 9 S33). But, unless the former is equal to the latter, the mobile unit 5 decides it against a call to itself. In addition, when the terminating limit indicator bit PR is not set, the mobile unit 5 decides, if the received mobile unit identification number is equal to any of the closed number MIN(H)11 and the open number MIN(H)12, for a call to itsof. As shown in FIG. 8c, the mobile unit 5 can effect terminating limit in all the service areas registered by registering two kinds of the mobile number identification numbers for each of a plurality of the service areas SID(H)1 to SID(H)n in the NAM 548.

Moreover, two kinds or more of the mobile unit identification numbers MIN(H)11 to MIN(H)1n are previously without limiting them to two kinds, for the service area identification code SID(H)1 with a plurality of the terminating limit indicator bits PR provided, and these terminating limit indicator bits PR are compared with any of the registered mobile unit identification numbers in responce to the conditions of the terminating limit indicator bits PR and thereby terminating limit also be effected.

Although certain preferred embodiments have been shown and described, it should be understood that many changes and modifications may be made therein without departing from the scope of the appended claims.

What is claimed is:

1. A mobile radio unit in a cellular type wide area mobile communication system comprising:
    (1) a radio transmitter/receiver unit (TRU) for transmitting and receiving signals;
    (2) a means for selecting a channel for transmitting and receiving signals;
    (3) a handset composed of a dial and a telephone transmitter/receiver;
    (4) a control unit (CU) for controlling a speech path and for controlling said handset;
    (5) a first storing means for temporarily storing a service area identification code a mobile unit identification number in a page message received by said TRU;
    (6) a second storing means for storing terminating limit indicator information which is set or reset by operation of said handset;

(7) a third storing means for storing a plurality of sets of service area identification codes and a plurality of kinds of mobile unit identification numbers corresponding to the service area identification codes;

(8) a determining means for receiving said service area identification code stored in said first storing means and said service area identification codes stored in said third storing means and for determining whether or not the service area identification code stored in said first storing means is coincident with the service area identification codes stored in said third storing means, and for providing an indication of the result of the determination;

(9) a comparing means for receiving the mobile unit identification number stored in said first storing means and a specified one or a specified plurality of kinds of mobile unit identification numbers stored in said third storing means and for receiving a state of said second storing means and for comparing the mobile unit identification number stored in said first storing means with said specified one or said specified plurality of kinds of mobile unit identification numbers stored in said third storing means for thereby determining whether a call-in is for the mobile unit itself, depending on said state of said second storing means and for providing an indication of the result of the decision;

(10) a means for receiving the result of the determinations of the comparing means and determining means and for effecting a terminating response via said TRU when the service area identification code stored in said first storing means is coincident with the service area identification codes stored in said third storing means as determined by said determining means and when said mobile unit identification number stored in said first storing means and said mobile unit identification numbers stored in said third storing means are determined to be coincident by said comparing means.

* * * * *